United States Patent [19]
> Kobayashi

[11] Patent Number: 5,839,721
[45] Date of Patent: Nov. 24, 1998

[54] MOVABLE WORKBENCH AND AN ASSEMBLY LINE DEVICE USING THE WORKBENCH

[75] Inventor: Masaaki Kobayashi, Nagano-ken, Japan

[73] Assignee: Narakawa Industry Co., Ltd., Nagano-ken, Japan

[21] Appl. No.: 817,920
[22] PCT Filed: Aug. 22, 1996
[86] PCT No.: PCT/JP96/02364
§ 371 Date: Jun. 24, 1997
§ 102(e) Date: Jun. 24, 1997
[87] PCT Pub. No.: WO97/07940
PCT Pub. Date: Mar. 6, 1997

[30] Foreign Application Priority Data

Aug. 25, 1995 [JP] Japan .................................. 7-216832

[51] Int. Cl.⁶ ........................................................ B23Q 1/64
[52] U.S. Cl. .............................................. 269/57; 269/309
[58] Field of Search ........................... 269/309, 57, 294, 269/295, 308, 312, 289; 198/465.2, 465.1; 105/144, 141, 215.1; 104/118, 119

[56] References Cited

U.S. PATENT DOCUMENTS

| | | | |
|---|---|---|---|
| 1,615,860 | 2/1927 | Williams | 269/309 |
| 2,152,801 | 4/1939 | Harrington | 269/309 |
| 3,424,106 | 1/1969 | Scroggs et al. | 105/215.1 |
| 3,807,312 | 4/1974 | Flodell | 105/215.1 |
| 4,403,553 | 9/1983 | Binder | 105/215.1 |
| 5,653,172 | 8/1997 | Roscher | 104/118 |
| 5,662,317 | 9/1997 | Beakes et al. | 269/309 |

FOREIGN PATENT DOCUMENTS

| | | |
|---|---|---|
| 45-35961 B1 | 11/1970 | Japan . |
| 61-72405 U | 5/1986 | Japan . |
| 02-22902 U | 2/1990 | Japan . |
| 6-254751 A | 9/1994 | Japan . |

*Primary Examiner*—Robert C. Watson
*Assistant Examiner*—Lee Wilson
*Attorney, Agent, or Firm*—Rosenthal & Osha L.L.P.

[57] ABSTRACT

A movable workbench 6 has a work board 7, second casters 8 attached on one side of the back of the work board, and first casters 9 attached on the other side thereof. The first casters 9 can rotate freely around an axis of rotation 91 perpendicular to the back of the work board 71, and have rollers 92 and 93 which can rotate freely around axes of rotation 92*a* and 93*a* respectively which are inclined symmetrically with respect to the axis 91. The rollers 92 and 93 also have plates to prevent running off 94 and 95 respectively. Because the pair of rollers 92 and 93 are put on a cylindrical rail 35 and roll along the rail, the movable workbench 6 can be moved along the rail by manpower. Since each of the casters can rotate freely, the casters can be moved along an arc-like line. In addition, the plates 94 and 95 prevent the workbench 6 from running off the rail even if the workbench is inclined. Accordingly, the movable workbench has a simple construction and can be manufactured inexpensively, and makes it possible to construct an assembly line device in which an assembly line can be extended or changed easily.

9 Claims, 5 Drawing Sheets

5,839,721

MOVABLE WORKBENCH AND AN ASSEMBLY LINE DEVICE USING THE WORKBENCH

BACKGROUND OF THE INVENTION

1. Field of the Invention

This invention relates to a movable workbench which is moved along an assembly line by manpower. This invention is also relates to an assembly line device which moves the movable workbench along a rail arranged along an assembly line to constitute an assembly line of products.

2. Description of the Prior Art

A variety of electrical and electronic equipment is assembled in such a way that a chassis for attachment and so forth are put on a movable workbench and moved along an assembly line, and at each work position of the line a variety of parts are attached by an operator or an automatic mechanism.

Generally, a conveyor line is used as an assembly line. At a conveyor line, a belt conveyor or a chain conveyor carries a number of movable workbenches at a certain interval and at a certain speed, and operators and others along the line attach and inspect a variety of parts.

In the aforementioned assembly line, usually workbenches are carried in one direction and the workbenches which have become empty after the work is finished are returned to the starting point of the line. This is due to the fact that because it is difficult to form an arc-shaped line on the same plane, it is impossible to use a loop-type assembly line.

In addition, such an assembly line generally needs a large sum of money to install, and is difficult to extend or change.

Thus the object of this invention is to propose a movable workbench which can solve such problems, and an assembly line device using the workbench.

BRIEF SUMMARY OF THE INVENTION

In order to solve the above-mentioned problems, the movable workbench according to this invention has a work board, and first and second casters attached to the back of the work board; wherein the first casters have an attachment plate attached to the back of the work board, a rotary plate supported by the attachment plate in such a way as to rotate freely around an axis of rotation perpendicular to the back of the work board, and a pair of rollers whose axes of rotation intersect at an angle of less than 180°, and which are supported by the rotary plate at an interval such that the rollers will not interfere with each other; and wherein the rollers, on a rail extending in the direction in which the movable workbench moves, are able to roll along the rail.

It is desirable to attach to each of the rollers a plate to prevent the rollers from running off the rail which extends at right angles to the axis of rotation of the rollers.

The work board is generally a rectangular board having a certain thickness. In such a case, on the two corners on the same side of the work board the first casters are attached while on the other two corners the second casters are attached.

A rotary board may be attached to the work board in such a way as to rotate freely.

Next, this invention relates to an assembly line device using the movable workbench constituted as described above. The device according to this invention has an assembly line in which each work position is arranged along a closed line according to a procedure of each assembly process, a rail put along the assembly line, and a plurality of movable workbenches which can move along the rail. The movable workbenches are constituted as described before.

As the rail, it is desirable to use a rail having a circular outer face such as a cylindrical pipe.

BRIEF DESCRIPTION OF THE DRAWINGS

FIG. 2 illustrates a movable workbench according to this invention, in which

FIG. 3 illustrates the first caster of the movable workbench shown in FIG. 2, in which

FIG. 5 illustrates a modified example of the movable workbench, in which

DETAILED DESCRIPTION

Now an embodiment of this invention will be described with reference to the attached drawings.

Figure 1:
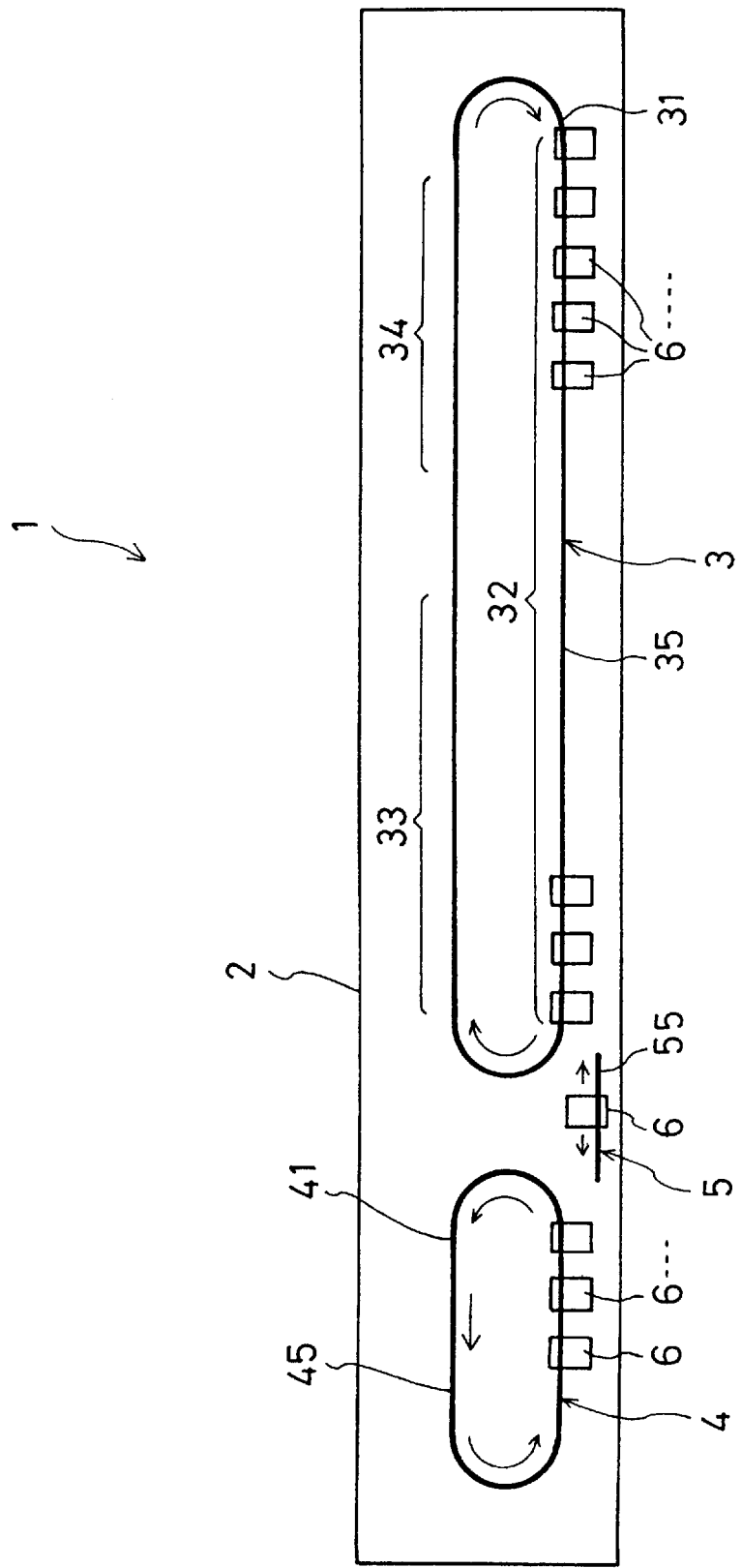
FIG. 1 illustrates an assembly line according to this invention.

FIG. 1 shows an assembly line device using the movable workbenches according to this invention.

An assembly line device 1 in this example is appropriate for the assembly of products such as a printer. The device 1 is constituted in such a way that on a work table 2 are three kinds of assembly lines. One is a main assembly line 3, another is a sub-line 4, and between these lines is the other auxiliary line 5. The main line 3 starts at the position shown by the reference numeral 31. This is a line for the assembly of lower cases of a printer, for example, and the cases are assembled in the position 32, the assembled products are inspected in the position 33, and after the inspection the products are packed in the position 34. On the other hand, the sub-line 4 starts at the position shown by the reference numeral 41, and is a line for the assembly of upper cases of a printer, for example. The auxiliary line 5 is a line where the upper and lower cases already assembled are combined and thereby the products are finished.

The lines 3, 4 and 5 are defined by rails 35, 45 and 55 using cylindrical pipes made of vinyl chloride in this example. As is clear from the drawing, the rails 35 and 45 form a long and narrow loop-shaped line. The rail 55 forms a straight line having a predetermined length.

On the rails 35, 45 and 55 of the lines 3, 4 and 5 are a number of movable workbenches 6. The movable workbenches 6 are pushed along the rails by operators and move successively from the upstream side to the downstream side of the line.

Figure 2A:
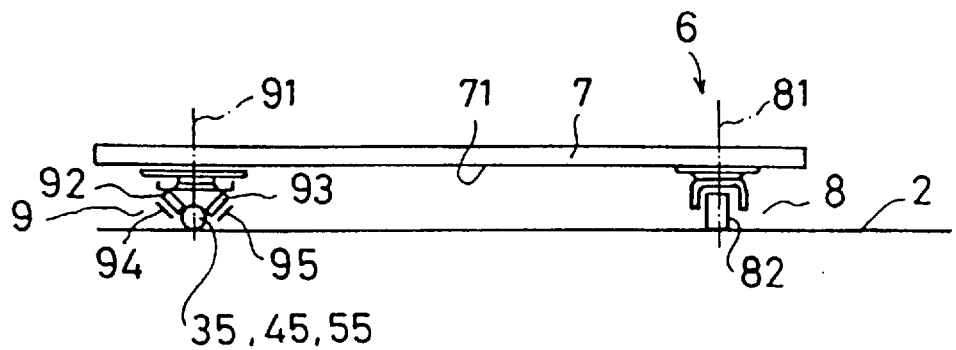
FIG. 2A is a side view thereof and 2B is a plan view thereof.
Figure 2B:
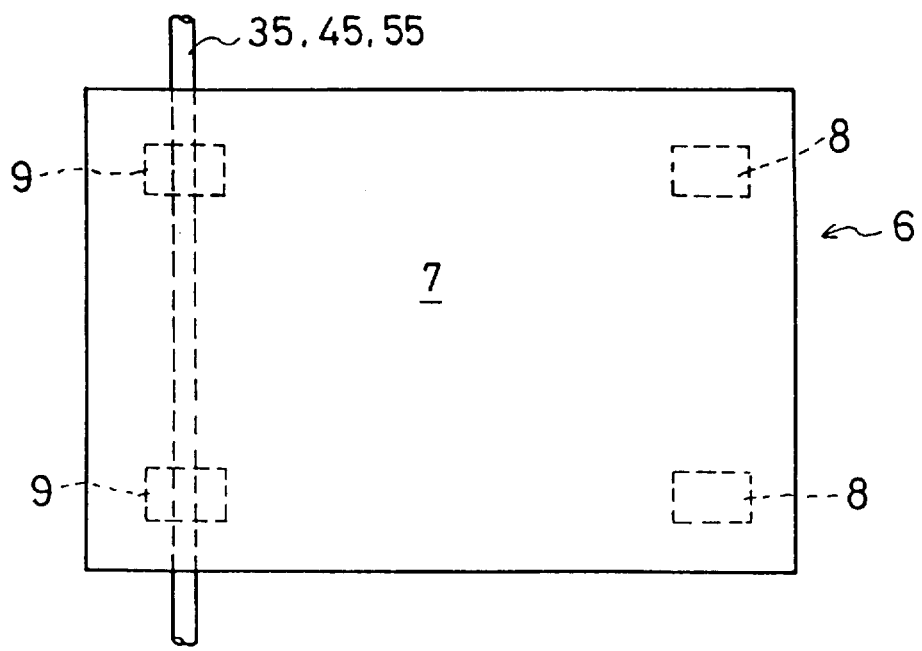

FIG. 2 illustrates the movable workbench 6. The movable workbench 6 in this example has a rectangular work board 7, the second casters 8 attached to the two corners on this side of the back of the work board 7, and the first casters 9 attached to the two corners on the other side of the back of the work board 7.

The first casters 9 have a pair of rollers 92 and 93 attached around an axis of rotation 91 perpendicular to the back 71 of the work board 7 in such a way as to rotate freely, and the rollers 92 and 93 roll along the cylindrical rails 35, 45 and 55. A pair of plates 94 and 95 are attached to prevent the rollers 92 and 93 from running off the rails. The second casters 8 are casters generally used, and have a wheel 82 attached around an axis of rotation 81 perpendicular to the back 71 of the work board 7 in such a way as to rotate freely. The wheel 82 rolls on the work table 2.

Figure 3A:
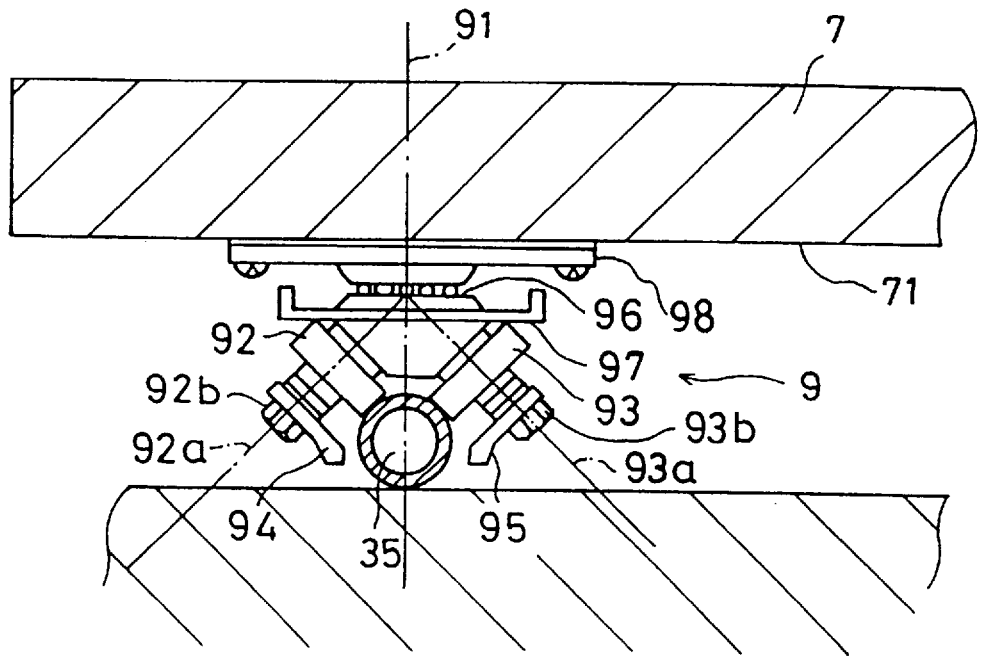
FIG. 3A is an enlarged side view thereof, and 3B shows the relationship between a pair of rollers and a rail.
Figure 3B:
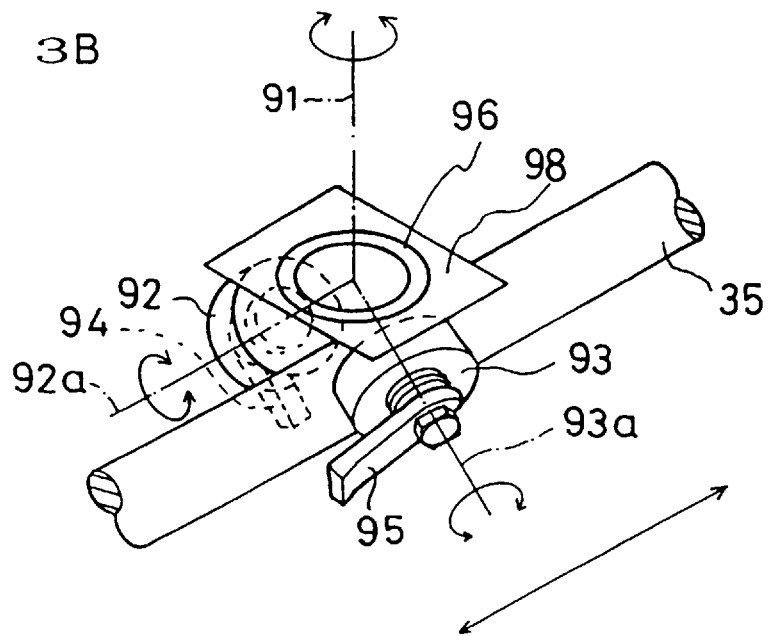

FIG. 3 is an enlarged view of the first caster 9. The first caster 9 has a rectangular attachment plate 98 on the upper end thereof, which is screwed on the back 71 of the work board. On the underside of the attachment plate 98 a rotary plate 97 is supported by means of a bearing 96 around an axis of rotation 91 in such a way as to rotate freely. On the underside of the rotary plate 97 the rollers 92 and 93 are borne symmetrically around axes of rotation 92a and 93a whose angle of inclination with respect to the axis of rotation 91 is 45° in such a way as to rotate freely. Accordingly, the axes of rotation of these rollers are perpendicular to each other. Here the rollers 92 and 93 are such that the size and interval thereof do not interfere with each other, and the outer faces thereof are exactly circumscribed by the outer face of the rails 35, 45 and 55 (shown by only the reference numeral 35 in the drawing).

Further, in this example the plates 94 and 95 to prevent running off are attached on the head side of axis bolts 92b and 93b of the rollers 92 and 93 respectively. These plates 94 and 95 to prevent running off are perpendicular to the axes of rotation 92a and 93a.

The movable workbench 6 in this example constituted as described above is installed such that the first casters 9 are on the rails 35, 45 and 55, and the second casters 8 are on the work table 2. Under such conditions, as is shown in FIGS. 2 and 3, the pair of rollers 92 and 93 of the first casters 9 are on the outer face of the rails 35, 45 and 55, along which the rollers can roll freely. Under these conditions, when an operator pushes the movable workbench 6 along the rail, the first casters 9 move along the rails 35, 45 and 55, and the second casters 8 move on the work table 2. Because the pair of rollers 92 and 93 are attached with the rails 35, 45 and 55 between, the movable workbench 6 moves along the rails 35, 45 and 55 without running off these rails. That is, the workbench 6 moves along the assembly lines 3, 4 or 5.

Because the lines 3 and 4, for example, are loop-shaped, the lines have a half-round curved portion. The movable workbench 6 in this example can move on such an arc-like line portion as on a straight line portion. The first and second casters 8 and 9 are attached to the work board 7 around the axes of rotation 81 and 91 respectively which are perpendicular to the work board 7 in such a way as to rotate freely. Accordingly, the casters 8 and 9 turn around the axes of rotation 81 and 91 respectively in the arc-like line portion, and the movement of the workbench is not hindered.

In this example, the first casters 9 have the pair of plates 94 and 95 to prevent running off with the rails 35, 45 and 55 between. These plates 94 and 95 prevent the casters from running off the rails even when the movable workbench 6 swings back and forth or from side to side. Furthermore, when the work is done with the workbench 6 inclined, the plates 94 and 95 prevent the workbench 6 from running off the rails even if the workbench is inclined to a certain angle.

Figure 4:
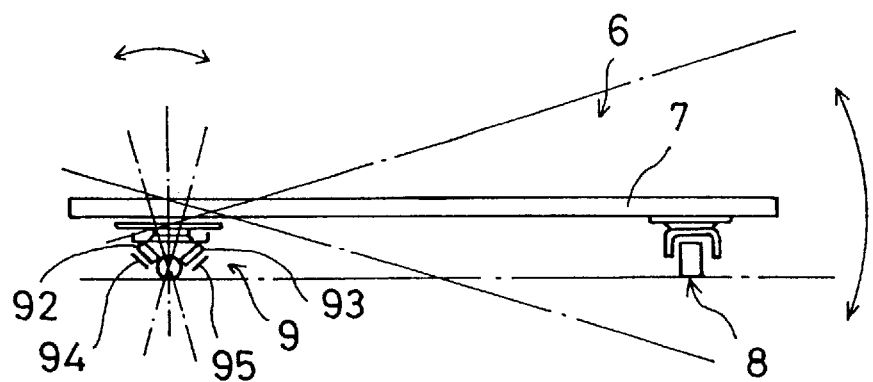
FIG. 4 illustrates the function of the movable workbench.

As FIG. 4 shows, when the workbench 6 is inclined in the direction shown by an arrow, there is the possibility that the pair of rollers 92 and 93 will slip down and run off the cylindrical rails 35, 45 and 55. But the tip of one of the pair of plates 94 and 95 to prevent running off touches the outer face of the rails and prevents the rollers from slipping down.

Thus in the assembly line using the movable workbenches 6 in this example, it is possible to move the workbenches with this side to which the second casters 8 are attached inclined downward or upward. Accordingly it is now easy to attach parts to the back of a chassis and so forth, or to inspect parts on the back of a chassis if the work table surface is formed such that the workbench 6 is inclined back and forth, and the rails are laid along the inclined surface.

Figure 5A:
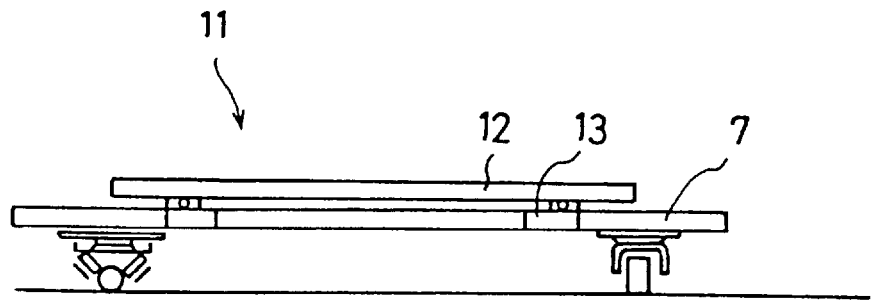
FIG. 5A is a side view thereof, and 5B is a plan view thereof.
Figure 5B:
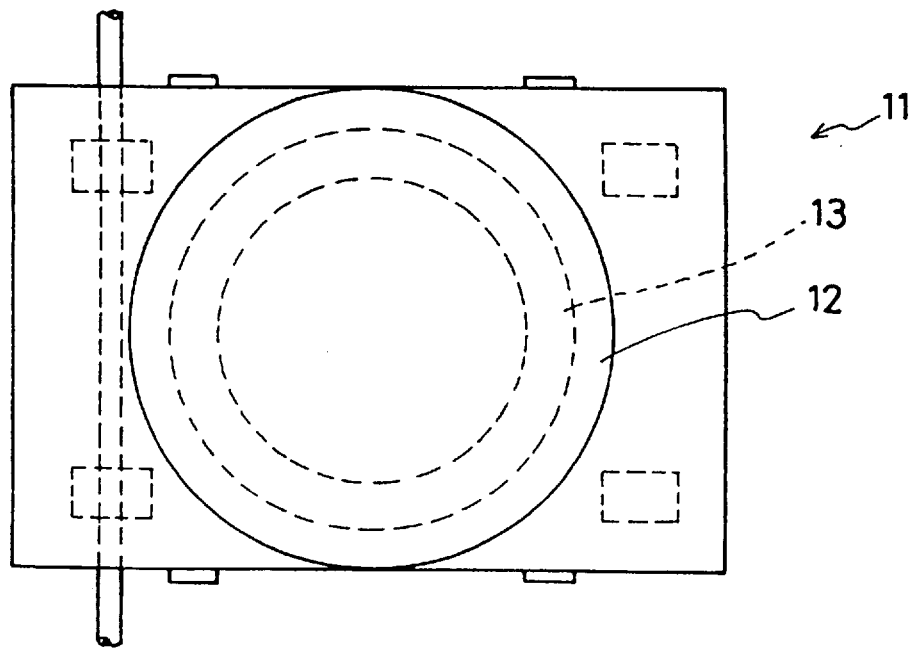

FIG. 5 illustrates a modified example of the aforementioned movable workbench. Since a movable workbench 11 shown in this drawing basically has the same structure as the movable workbench 6 described above, only different portions will be explained. In this example, a circular rotary board 12 is attached to the surface of the work board 7. The rotary board 12 is on the work board 7 in such a way as to rotate freely by means of a bearing 13 arranged in an annular shape. In the case of the movable workbench 11 constituted as described above, when parts are attached to the rear of the products put on the rotary board 12 thereof, all an operator has to do is to rotate the rotary board 12, and an operator need not stretch his hands and work uncomfortably.

Though the movable workbench is rectangular as a whole in this example, needless to say, the movable workbench may take other shapes such as ellipse.

Further, four casters are used in the above examples, but less than four or more than four casters may be used. Typical casters are used as the second casters. Other types of casters may be used as long as the second casters support the work board on the work table such that the work board moves freely. For example, all the casters may have the same shape as the first casters of this invention, and the movable workbench may run on two parallel rails.

A variety of line shapes are possible as an assembly line. Therefore, the loop-shaped line is only one example and is not intended as the only possible shape of this invention.

The rails to be used are not limited to cylindrical pipes, but the rails having other shapes may be used. What is necessary is that a pair of rollers can roll on the rails.

As is clear from the above description, according to this invention movable workbenches which have a simple structure and can be moved by manpower can be realized. If these movable workbenches are used, it is easy to construct a closed assembly line. Accordingly, it is not necessary to have a separate mechanism to move empty movable workbenches from the end to the starting point of the line. In addition, this invention enables the assembly line to be extended or changed easily if the rails are extended and the route thereof is changed. Hence the extremely simple and inexpensive change of the lines and so forth.

Furthermore, according to this invention, because the movable workbenches can be inclined, operators can assemble parts on the workbenches comfortably. Moreover, if a rotary board is put on the work board, operators can attach parts to the rear of the products comfortably.

I claim:

1. A movable workbench for movement along a rail comprising:
    a work board having a top surface and a bottom surface; and
    a first and a second caster attached to the bottom surface of the work board, at least the first caster comprising:
        an attachment plate mounted on the bottom surface of the work board;
        a rotary plate supported by said attachment plate in such a way as to rotate freely about an axis of rotation perpendicular to the bottom surface of the work board; and
        a pair of rollers supported by the rotary plate, the rollers having axes of rotation intersecting at an angle of less than 180°, the rollers being adapted to roll along the rail.

2. The movable workbench according to claim 1, wherein each roller includes a plate which extends at a right angle to the axis of rotation of the roller, the plate being arranged to prevent the roller from running off the rail.

3. The movable workbench according to claim 1, wherein the work board is a rectangular board having a predetermined thickness and wherein the first caster is mounted on a first end of the work board and the second caster is mounted on a second end of the work board opposite the first end.

4. The movable workbench according to claim 1, wherein a rotary board is attached to the top surface of the work board in such a way as to rotate freely.

5. An apparatus for assembling products, comprising:

an assembly line having one or more work position arranged along a closed line in a predetermined pattern;

a rail positioned along the assembly line; and a plurality of movable workbenches for movement along the rail, each movable workbench comprising:
a work board having a top surface and a bottom surface;
a first and a second caster attached to the bottom surface of the work board, wherein at least the first caster includes: an attachment plate attached to the bottom surface of the work board, a rotary plate supported by the attachment plate in such a way as to rotate freely about an axis of rotation perpendicular to the bottom surface of the work board, and a pair of rollers supported by the rotary plate, the rollers having axes of rotation intersecting at an angle of less than 180°, the rollers being adapted to roll along the rail as the workbench is pushed along the rail.

6. The apparatus according to claim 5, wherein each roller includes a plate which extends at a right angle to the axis of rotation of the roller, the plate being arranged to prevent the roller from running off the rail.

7. The apparatus according to claim 5, wherein the work board is a rectangular board having a predetermined thickness and wherein the first caster is mounted on a first end of the work board and the second caster is mounted on a second end of the work board opposite the first end.

8. The apparatus according to claim 5, wherein the rail has a circular outer face.

9. The apparatus according to claim 5, wherein a rotary board is attached to the top surface of the work board in such a way as to rotate freely.

* * * * *